(12) United States Patent
Weiss et al.

(10) Patent No.: US 6,958,189 B2
(45) Date of Patent: Oct. 25, 2005

(54) INK FOR A POLYCARBONATE SUBSTRATE

(75) Inventors: Keith D. Weiss, Fenton, MI (US); Claus-Peter Reisinger, Ann Arbor, MI (US); Jason Beaudoin, West Bloomfield, MI (US)

(73) Assignee: Exatec, LLC, Wixom, MI (US)

( * ) Notice: Subject to any disclaimer, the term of this patent is extended or adjusted under 35 U.S.C. 154(b) by 53 days.

(21) Appl. No.: 10/403,361

(22) Filed: Mar. 31, 2003

(65) Prior Publication Data

US 2004/0191521 A1 Sep. 30, 2004

(51) Int. Cl.⁷ .................................................. B32B 27/36
(52) U.S. Cl. ..................... 428/412; 428/480; 428/423.7
(58) Field of Search ................................. 428/412, 480, 428/423.7

(56) References Cited

U.S. PATENT DOCUMENTS

| | | | |
|---|---|---|---|
| 4,896,598 A | | 1/1990 | Leech, Jr. |
| 4,996,252 A | | 2/1991 | Phan et al. |
| 5,039,339 A | | 8/1991 | Phan et al. |
| 5,452,658 A | | 9/1995 | Shell |
| 5,648,414 A | | 7/1997 | Bier et al. |
| 5,766,739 A | | 6/1998 | Funaki et al. |
| 6,132,861 A | * | 10/2000 | Kang et al. .................. 428/323 |
| 6,465,101 B1 | | 10/2002 | MacGregor et al. |
| 6,534,128 B1 | * | 3/2003 | Carlson et al. ............. 427/466 |
| 2001/0046594 A1 | | 11/2001 | Takemoto |

FOREIGN PATENT DOCUMENTS

| | | |
|---|---|---|
| EP | 0 688 839 A2 | 12/1995 |
| EP | WO 97/34768 | 9/1997 |
| EP | 1031596 | 8/2000 |
| JP | 7082396 | 3/1995 |
| JP | 2001 262016 | 9/2001 |

OTHER PUBLICATIONS

Nazdar, "Nazdar Introduces 8400 Series CVIM In–Mold Decorating Inks", Aug. 2001, printed on Sep. 1, 2004 from Nazdar.com.*

"Methyl Isobutyl Ketone", Kirk–Othmer Encyclopedia of Chemical Technology, D. Muthusamy et al., John Wiley & Sons, online posting date Oct. 18, 2001.*

Publication Surface Phenomena and Latexes in Waterborne Coating and Printing Technology, by M.K. Sharma, Plenum Press, NY (1995).

Journal of Electronics Manufacturing, vol. 9, No. 3 (Sep., 1999) 203–213, entitled "Screen Printing Process Design of Experiments for Fine Line Printing of Thick Film Ceramic Substrates".

SGIA Journal Fourth Quarter 1999, pp. 28. 30, 32,34, 36, entitled "SPTF'S New Picture of the Screen Printing Process".

Screenprinting publication (May 2002) entitled "Understanding The Variables Of Plastisol Printing" by Mike Ukena.

Website "ScreenWeb" entitled "Inks For Pad Printing" (Mar. 25, 2002).

Pad Printing Article, entitled "Understanding and Using Pad Printing Inks" by Peter Kiddell, pp. 1–9.

Publication from Solar Energy Materials & Solar Cells, (2001 Elsevier Science B.V.) entitled "Progress in Thick–Film Pad Printing Technique for Solar Cells", pp. 399–407.

Publication from Plastics Engineering, entitled "Pad Printing Impresses The Plastics Industry" (Jun. 1987) by Heinz Grob.

* cited by examiner

*Primary Examiner*—Melanie Bissett
(74) *Attorney, Agent, or Firm*—Brinks Hofer Gilson & Lione

(57) ABSTRACT

The present invention is generally directed towards a polycarbonate surface having an ink printed on the surface. The ink adheres to the polycarbonate and is compatible with a hard coat applied to the polycarbonate substrate. The ink comprises a polycarbonate or a polyester resin or an acrylic resin. The ink composition also comprises a blend of polycarbonate ink or an acrylic ink with a polyester ink such that the ink adheres to the polycarbonate substrate on subjecting the substrate to water immersion and cataplasma tests.

32 Claims, No Drawings

INK FOR A POLYCARBONATE SUBSTRATE

TECHNICAL FIELD

This invention relates to a polycarbonate substrate having an ink that adheres to the polycarbonate substrate and is compatible with a hard-coat system.

BACKGROUND

Plastic materials are being used in a number of automotive engineering applications to enhance vehicle styling. One such plastic used in the automotive industry is polycarbonate. Due to superior mechanical and thermal properties polycarbonate is used in the manufacturing of numerous part and components, such as B-pillars, headlamps, and sunroofs. An emerging application for polycarbonate is automotive window systems. When polycarbonate is used to manufacture automotive windows, it is a manufacturing requirement that such windows have identification markings. The perimeter of a window often must be marked with an opaque fade-out border to enhance appearance of the installed window. Additionally, it is also a manufacturing requirement that windows are coated to make them scratch resistant.

In order to mark such polycarbonate surfaces with information and a fade-out border, inks that are used must not only adhere to the polycarbonate surface but must also be compatible with any primer/coating systems that are applied to its surface for abrasion and UV protection. Any ink used to mark the surface of a polycarbonate window must not be softened, damaged, or removed during the application of the protective coating system. The inks must also be able to survive the rigorous testing required to qualify the product by the automotive industry.

Therefore, there is a need in the industry to formulate inks that not only adhere to a polycarbonate surface but also are compatible to any primer/coating systems that are used to protect the polycarbonate surface.

SUMMARY

In one aspect of the present invention, a polycarbonate substrate having an ink printed on a surface is disclosed. In yet another aspect of the present invention, the ink composition compatible with a primer/coating system is disclosed. The compatibility of the ink is tested by determining the amount of ink that has bled or has been rubbed off during the application of the primer/coating system.

In yet another aspect of the present invention, an ink having a blend of polycarbonate resins or acrylic resins with polyester resins is formulated.

In yet another aspect of the present invention, an additive, such as an isocyanate is added to aid in cross-linking of the polyester resins and the polycarbonate or acrylic resins. The polycarbonate surface with the ink applied and cured is subjected to a Cataplasma test. In yet another aspect, an ink that survives the Cataplasma test and is compatible with a primer/silicone hard-coat system is formulated.

DETAILED DESCRIPTION

The following description of the preferred embodiment is merely exemplary in nature and is in no way intended to limit the invention or its application or uses.

The present invention provides for a polycarbonate substrate having an ink printed on a surface of the polycarbonate substrate. Preferably, the polycarbonate substrate includes bisphenol A polycarbonate and all other resin grades (such as branched, substituted etc) as well as being copolymerized or blended with other polymers such as PBT, ABS or polyethylene. Inks that are printed on the surface of the polycarbonate substrate include a synthetic resin group such that the ink adheres to the surface of the polycarbonate substrate. Preferably, such synthetic resin groups are polyester-based resins, polycarbonate-based resins or acrylic-based resins. The ink may be applied onto the surface of the polycarbonate via screen printing, although other methods of printing known to those skilled in the art are acceptable, such as but not limited to mask/spray and tampon printing.

As discussed above, when such inks are applied to polycarbonate substrates and specifically used for automotive application, the polycarbonate surface with the ink is typically coated with a coating system preferably a primer/hard-coat system. In the present invention, the coating system preferably comprises an acrylic primer and a silicone hard-coat. Alternatively, other primer/coating systems may be used. Therefore, any ink selected to be used in automotive applications must not only adhere to the polycarbonate substrate, but also adhere to the primer used in the coating system. Primers are commercially available from General Electric Silicones as SHP401 and SHP470. The primer is coated on the polycarbonate substrate and air dried or thermally cured depending upon the primer grade selected. The hard-coat is then applied over the primer layer and is air dried before curing at 120–130° C. for at least 30 minutes. The preferred hard-coat used in the present invention is also available from General Electric Silicones as AS4000 or AS4700.

The general classes of solvents present in primer/hard-coat systems include glycol ethers, ketones, alcohols and acetates. For example, the solvents present in the SHP401 and SHP470 primers include diacetone alcohol (DAA also called 4-hydroxy-4-methyl-2-pentanone) and 1-methoxy-2-propanol (also called glycol ether PM or propylene glycol monomethyl ether, or 1-methoxy-2-hydroxypropane). The resin content in these acrylic primers is typically about 2–7% wt of the primer. Preferably, the acrylic resin in these primers is polymethyl methacrylate. Other polymeric resins may be utilized in the primer provided that the solvent system for this primer is similar to that described above.

Alternatively, a primeness hard-coat may be used. One such primeness hard-coat is commercially available from General Electric Silicones as PHC587. This hard-coat typically contains methanol (M), isopropyl alcohol (IPA), n-butyl alcohol (B), and water (W) in a weight ratio of 3(M):6(IPA):3(B):1(W). Therefore any ink selected must not only adhere to the polycarbonate substrate, but also adhere to the primeness hard-coat. The silicone resin in this particular primeness hard-coat and for most other silicone hard-coats is methylsilsequioxane. This primeness hard-coat, as well as the hard-coat systems comprising a primer and topcoat is applied to the polycarbonate substrate containing the printed ink pattern by dipping the polycarbonate substrate in the coating at room temperature and atmospheric pressure. Alternatively, the hard-coat systems may be applied by flow coat or spray processes.

In order for the ink to withstand the strong solvents used in the primer or primeness hard-coat, it is important that the synthetic resins used in the ink formulations are capable of cross-linking after being applied to the polycarbonate surface. In order to test if the ink can withstand exposure to the solvents in the primer or hard-coat, the ink is subjected to a "compatibility test". In the present invention, the ink is considered compatible with the coating system hence acceptable, if the ink is not chemically or physically affected by the primer or primeness hard-coat. Chemical and physical affects are quantified by observing if the ink immediately after the application of the coating system onto the printed polycarbonate substrate either bleeds or is softened to the point where it can easily be removed from the substrate via rubbing; or if the applied primer crawls during application. A coating will crawl when a surface energy/surface tension gradient causes the coating to ineffectively "wet" the surface of the dried ink print. In other words, if the ink does not bleed or rub-off of the substrate after being exposed to the hard-coat system or if the primer does not crawl during application, the ink may be used on the polycarbonate substrate and acceptable for applying a primer/hard-coat system.

The inventors conducted multiple experiments to test the compatibly of inks with the polycarbonate substrate and the coating system. The inventors discovered that most synthetic resin inks (about 84% overall), which included single component, plural component, and radiation curable resins with good adhesion to polycarbonate, were not compatible with a coating system. The inventors further found that about 43% plural component inks, about 90% single component inks, and about 100% radiation curable inks were not compatible with the coating system. Such single component inks included acrylic resin inks, acrylic/nitrocellulose resin inks, nitrocellulose/polyamide resin inks, vinyl/acrylic resin inks, alkyd resin inks, vinyl/polyester resin inks, vinyl resin inks, polycarbonate resin inks, and polyester resin inks. Plural component inks included epoxy resin inks, acrylic resin inks, polyester resin inks and polyurethane resin inks. Radiation curable inks included acrylate resin inks.

The inventors have found that when the single component inks were tested for compatibility only the inks arising from a specific polycarbonate resin, polyester resin, or acrylic resin family passed the test. The polyester resin in the ink that passed the compatibility test is a mixture of saturated polyesters, which are either straight or branch-chained aliphatic or aromatic polymers. These polymers can contain either hydroxyl or carboxyl groups that form films via condensation polymerization with other resins (e.g., amino formaldehyde, melamine, polyisocyanates, etc.) that contain complimentary reactive groups. Saturated polyesters are made from the polymerization of various alcohols (di-, tri- & tetra-hydric alcohols) and acids (or acid anhydrides), such as orthophthalic anhydride, terephthalic acids, and trimellitic anhydride. Most commonly an excess of polyol is used, thereby, providing excess hydroxyl functionality in the final resin. It is known that some polyols, such as 2,2,4-trimethyl, 1,3-pentanediol (TMPD), 1,4-cyclohexane dimethanol (CHDM), neopentyl glycol (NPG), and trimethylol propane (TMP) give more hydrolytically stable systems than do ethylene glycol or glycerol. If excess acid is used as a raw material, the resulting resin will contain carboxylated functionality.

The inventors found that the acrylic ink that passed the compatibility test contains a thermosetting acrylic resin as opposed to a thermoplastic resin. Thermosetting acrylic resins contain either hydroxyl or carboxyl functionality that can either cross-link via self-condensation of the functional groups or by reaction with the functional groups on another polymer at an elevated temperature. Hydroxyl functionality is more likely with the hydroxyl-functional resin being called a polyacrylic-polyol. Typically, the monomers utilized in the preparation of a thermoset acrylic resin include monoallyl ethers of polyols, hydroxyethyl methacrylate, hydroxypropyl methacrylate, or hydroxypropyl acrylate. The most chemical resistant and hydrolytically stable resins result from either high alkyl methacrylates (e.g., methyl methacrylate, butyl methacrylate, etc.), acrylates with ethyl side chains (e.g., 2-ethyl hexylacrylate, etc.), or itaconic acid. The acrylic resin may also contain copolymerized segments, such as with polyvinyl chloride (PVC).

The polycarbonate ink that passed the compatibility test contains a high temperature polycarbonate resin. This polycarbonate resin used in inks is suitable for in-mold decoration (IMD) with a polycarbonate molded substrate. The polycarbonate resin is typically based on geminally disubstituted dihydroxydiphenyl cycloalkanes. The resin may contain bifunctional carbonate structural units or hydroxyl groups. The polycarbonate backbone may be aliphatic or aromatic, as well as linear or branched. The hydroxyl groups present in the binder may be obtained from the alcoholysis of diphenyl carbonate with a polyol, such as an alkylene diol or an alkylene ether diol. Other suitable diols or diphenols include dihydroxydiphenyl cycloalkanes, such as 2,2-bis-(4-(2-hydroxypropoxy)phenyl)-propane and 1,1-bis-(4-hydroxyphenyl)-3,3,5-trimethyl cyclohexane. A variety of other polyols containing more than two hydroxyl groups, such as trimethyol propane, glycerine, or pentaerythritol may be incorporated.

It is the theory of the inventors that the inks having the above mentioned polycarbonate resins, polyester resins or acrylic resins have residual hydroxyl functional groups that promote self-condensation or homopolymer cross-linking of the resin in the ink while maintaining sufficient adhesion to the polycarbonate surface. Therefore, when primer is added, inks that cross-link in this manner do not soften or re-dissolve during exposure to the solvents present in the primer. Adhesion between the cross-linked ink and the polycarbonate surface is believed to be due to mechanical interlocking of polymer chains and hydrogen bonding with other bonding forces, such as Van der Waal forces or covalent bond formation being possible. The solvents in the ink play a similar role as the solvents in the primer, in that, they swell the surface of the polycarbonate in order to allow the syntheticc resin or binder to penetrate the surface layers of the polycarbonate and establish adhesion.

After the ink is subjected to the "compatibility test", the ink also has to pass additional tests that have been specified by automotive original equipment manufacturers (OEM). Such tests include a water immersion test at elevated temperatures, a Cataplasma-Like or a full Cataplasma test. Unless the ink passes all the tests specified, the polycarbonate substrate can not be used in the assembled motor vehicle.

The water immersion test consists of an initial cross-hatch adhesion test (tape pull) according to ASTM D3359-95 followed by submersing the printed polycarbonates in distilled water at elevated temperatures around 65° C. for approximately 10 days. The adhesion of the ink and coating is tested about every other day up to the maximum of 10 days. An ink passes the test only if greater than 95% retention of the ink and coating was obtained on the $10^{th}$ day.

The Cataplasma-Like and full Cataplasma tests consist of exposing the printed and coated substrate to high humidity at an elevated temperature followed by a low temperature shock (i.e., wrapping the system for 7 days in wet cotton at 70° C. followed by 3 hrs at −20° C.). After being equilibrated at room temperature (about 23° C.) polycarbonate substrate with printed ink is subjected to visual inspection for optical changes or defects, such as the development of haze, color change, blisters, microcracks, etc., as well a cross-hatch adhesion test performed according to the previously described ASTM protocol. The Cataplasma-Like test is identical to the full Cataplasma test except that the adhesive failure mechanism is not examined; rather only the appearance and adhesion of the printing and coating system are evaluated. In order for a printed polycarbonate substrate to pass this test there must be no change in optical appearance and greater than 95% retention of the ink and coating to the substrate after the cross-hatch adhesion (tape pull) test.

Therefore, for the polycarbonate substrate to pass the above tests, the entire system, i.e., polycarbonate substrate/ink/primer/hard-coat must exhibit a high level of hydrolytic stability at different temperatures and moisture conditions.

The inventors have unexpectantly found that an ink having a blend of polycarbonate resin or acrylic resins and polyester resins within a certain range is able to survive all OEM testing including water immersion, Cataplasma-Like, and full Cataplasma, and were found to be compatible with the hard-coat system. In order to promote additional cross-linking between the polycarbonate or acrylic resins and polyester resin, the formulated ink must contain a small amount of an isocyanate additive. The solvent preferably used is a mixture of aromatic hydrocarbons and dibasic acid esters. Specifically, the blended ink is characterized by 1.9% to 13.2% polyester resin, 5.4% to 34.2% polycarbonate resin or acrylic resin and 0.1% to 5.0% isocyanate and 20.7% to 84.3% solvent. Additionally, the formulated ink may contain 3.6% to 38.2% colorant pigment, 0.0% to 45.2% opacity enhancing filler, and 0.0% to 1.5% dispersant.

The ink may be prepared from the raw materials using dispersion techniques known to those skilled in the art, such as but not limited to ball mills, roll mills, attritor mills, and high speed blade mixers. The ink may be prepared by blending two ink formulations together in a certain ratio. Additional components not present in either of the two ink formulations, such as an isocyanate additive, dispersants, fillers, and pigments may be added to the formulation by the dispersion techniques described above. The inventors have found that ratio of the polycarbonate ink or acrylic ink to the polyester ink must be less than 100:0 and greater than 50:50.

The composition associated with the solids left in the applied and dried/cured print is about 49% to 72% of the polycarbonate ink or acrylic ink and about 12% to 18% of the polyester ink. The solids weight percent for the isocyanate additive incorporated into this blend is about 6% to 10%. This ink composition may also optionally contain up to about 1.5% of an additional surfactant and up to about 30% of additional fillers or pigments.

The polycarbonate ink (Noriphan® HTR, Pröll KG, Germany) used in the above mentioned blend contains a mixture of polycarbonate resin and high temperature stable pigments dispersed in ethylbenzene, solvent Naphtha (light aromatic), 1,2,4-trimethylbenzene, xylene isomers, diacetone alcohol, mesitylene, n-butyl alcohol, and various esters.

The polyester ink (8400 Series CVIM, Nazdar Inc., Kansas) comprises a polyester resin mixture (19–33%), TiO2 (0–38%), carbon black (0–11%), (11–21%), gamma-butyrolactone (4–10%), aliphatic dibasic acid ester and colorant pigment (0–11%) dispersed in petroleum distillate (14–28%), cyclohexanone mixture (4–8%), and naphthalene (<4%).

The acrylic ink (Series 450 JK, Ruco Druckfarben, Germany) blended into the above mentioned mixture in place of the polycarbonate ink contains a saturated acrylic resin and pigments dispersed in cyclohexanone (5–10%), trimethylbenzene (1–5%), xylene (1–5%), isopropylbenzene (1–5%), benzyl alcohol (10–20%), and butylglycolate.

The colorant pigment in the ink is preferably carbon black although other inorganic and organic colored pigments may be utilized. Such colorant pigment may include, but not be limited to carbon black, copper phtahocyanine blue, dioxazine violet, quinacridone magenta, azo diarylide yellow, rutile titanium dioxide (white), perylene red, molybdate orange, yellow iron oxide, chromium green oxide, or cadmium orange. Special effect pigments, such as pearlescent pigments and metallic flakes may be incorporated into the formulation.

The isocyanate additive used is preferably an aromatic polyisocyanate, such as the NB-70 catalyst (Nazdar Inc., Kansas). This particular isocyanate is dispersed in propylene glycol methyl ether acetate (40%, also called PM acetate) although other solvents could be utilized. The isocyanate can also be other aromatic or aliphatic diisocyanates, such as polymeric hexamethylene diisocyanate (HMDI), isophorone diisocyanate (IPDI), 2,6-tolylene diisocyanate (TDI), diphenylmethane diisocyanate (MDI), or xylene diisocyanate (XDI) among others.

The optional dispersant may be an ionic or nonionic dispersing agent. Such surfactants include but are not limited to metallic soaps, sulfonates, phosphate esters, fatty acid esters, fluoroaliphatic polymeric esters, titanate or ziconate or aluminate coupling agents, organomodified polysiloxanes, block copolymers of poly(alkylene oxide), and commercial proprietary surfactants, such as Hypermer® and Solsperse® hyperdispersants (ICI Americas, Inc.). The optional surfactant is preferably an organomodified polysiloxane, also called a polyether siloxane copolymer, such as Tego® Wet KL 245 (Goldshmidt Chemical Corp., Virginia).

The optional opacity enhancing fillers may be inorganic in nature, such as alumina, silica, titanium dioxide, magnesium silicate (talc), barium sulfate, calcium carbonate, aluminum silicate (clay), calcium silicate (wollastonite), aluminum potassium silicate (mica), metallic flakes, etc., or organic in nature, such as furnace black, channel black, and lamp black among others. Highly refractive fillers, such as titanium dioxide, are preferred for increasing opacity due to their small mean particle size of less than 1.0 micrometers. For example, titanium dioxide having a mean particle size of 0.36 micrometers is available as Ti-Pure® R-706 (DuPont Titanium Technologies, Delaware).

The following specific examples are given to illustrate the invention and should not be construed to limit the scope of the invention.

EXAMPLE 1

Compatibility Testing

Table 1 represents the inks that were subjected to the compatibility test. As shown the inks are identified with the associated resin family. The ink was mixed and prepared according to the manufacturer's technical data sheet. A simple drawdown technique known to those skilled in the art was used to apply the ink to the polycarbonate surface. Each ink was applied to multiple polycarbonate substrates in order to evaluate several acrylic primer/hard-coat systems. In each case, an ink thickness of about 8 micrometers was obtained as the applied print. Each ink was then dried or cured according to the manufacturer's recommended conditions.

TABLE 1

| INK TYPE | MANUFACTURER | RESIN FUNCTIONALITY | RECOMMENDED ADDITIVES |
|---|---|---|---|
| 1 Correx | Apollo Colours Ltd. (U.K) | 1K acrylic (cellulose) | 10% R126 (thinner) |
| 2 DynaPoll | Apollo Colours Ltd. (U.K) | 1K polyester | 10% R126 (thinner) |
| 3 Gloss Vinyl | Apollo Colours Ltd. (U.K) | 1K acrylic | 10% R33 (thinner) |
| 4 Matt Vinyl | Apollo Colours Ltd. (U.K) | 1K vinyl chloride acetate | 10% R14 (thinner) |
| 5 C28 | Coates Screen (Illinois) | 1K enamel (acrylic) | None |
| 6 C70 | Coates Screen (Illinois) | 1K acrylic | None |
| 7 C99 | Coates Screen (Illinois) | 1K acrylic | None |
| 8 HG-N501 | Coates Screen (Illinois) | 1K acrylic | None |
| 9 PO | Coates Screen (Illinois) | 1K acrylic nitrocellulose | None |
| 10 Color Gloss | Color Converting | 1K nitrocellulose/ polyamide | None |
| 11 PLT15 | Comec Italia srl (Italy) | 1K acrylic | 10% TPA (thinner) |
| 12 PLT272 | Comec Italia srl (Italy) | 1K acrylic | 10% TPA (thinner) |
| 13 DR III | Environmental Inks | 1K acrylic emulsion | None |
| 14 PAC Series | Ink Technology (Canada) | 1K acrylic | 15% PAC-1800 (thinner) |
| 15 AM Series | Ink Technology (Canada) | 1K vinyl (modified) | 15% AM-1800 (thinner) |
| 16 TPL | Marabuwerke GmbH & Co. (Germany) | 1K acrylic | 10% TPV (thinner) |
| 17 TPR | Marabuwerke GmbH & Co. (Germany) | 1K acrylic | 10% TPV (thinner) |
| 18 70000 | Nazdar Company (Kansas) | 1K acrylic | 10% 70182 (retarder) |
| 19 GV | Nazdar Company (Kansas) | 1K vinyl | 10% RE180 |
| 20 S2 | Nazdar Company (Kansas) | 1K vinyl (30% acrylic) | 10% S230 |
| 21 8800 Series | Nazdar Company (Kansas) | 1K vinyl (20% acrylic) | 15% RE180 |
| 22 8400 Series | Nazdar Company (Kansas) | 1K polyester | 10% RE196 (Retarder) |
| 23 3578/3579 | Nazdar Company (Kansas) | UV cure acrylates | None |
| 24 3478/3479 | Nazdar Company (Kansas) | UV cure acrylates | None |
| 25 MSK-1019 | Nor-Cote International Inc. (Indiana) | UV cure acrylates | None |
| 26 TF-4450 | Polymeric Imaging Inc. (Missouri) | UV cure acrylates | None |
| 27 711-8005 | Printcolor Screen LTD. (Switzerland) | 1K acrylic | None |
| 28 750-8005 | Printcolor Screen LTD. (Switzerland) | 2K acrylic | None |
| 29 752-8005 | Printcolor Screen LTD. (Switzerland) | 1K acrylic | None |
| 30 784-8005 | Printcolor Screen LTD. (Switzerland) | 2K acrylic | None |
| 31 Type B | Sun Chemical AG (Switzerland) | 2K polyester | 700001 (catalyst) + 10% 700010 |
| 32 Type KT | Sun Chemical AG (Switzerland) | 1K modified acrylic | None |
| 33 Type M | Sun Chemical AG (Switzerland) | 1K acrylic | 10% 700010 (retarder) |
| 34 Type V3000 | Sun Chemical AG (Switzerland) | 1K acrylic | 10% 700010 (retarder) |
| 35 Sorte P 948 | PrÖll KG (Germany) | 1K vinyl/acrylic | 10% VZ (retarder) |
| 36 Noriphan HTR | PrÖll KG (Germany) | 1K polycarbonate | 10% 097/003 (retarder) |
| 37 303LE | RedSpot Paint & Varnish (Indiana) | 2K polyurethane | 10% SV4380 |
| 38 180PE | RUCO Druckfarben (Germany) | 1K vinyl | 10% H5214 |
| 39 450JK | RUCO Druckfarben (Germany) | 1K acrylic | 10% 38472 (retarder) |
| 40 700ST | RUCO Druckfarben (Germany) | 2K polyurethane | 10% H5214 |
| 41 1979 | RustOleum Inc. (Illinois) | 1K acrylic latex | None |
| 42 7779 | RustOleum Inc. (Illinois) | 1K alkyd | None |
| 43 071-009 | Sericol Co. (U.K.) | UV cure acrylates | None |
| 44 GL-3517 | The Glidden Co. (Ohio) | 1K alkyd | None |
| 45 HD-7179 | The Glidden Co. (Ohio) | 1K acrylic latex | None |
| 46 STB | TOSH srl (Italy) | 2K epoxy | C1 (catalyst) + 10% D2 (thinner) |
| 47 STE | TOSH srl (Italy) | 1K vinyl polyester | 10% D2 (thinner) |
| 48 V2000 | Visprox (Holland) | 1K acrylic (cellulose) | 10% 81 (thinner) |
| 49 Type B | Wierderhold Sanitaertechnik (Germany) | 2K epoxy | BH/N (catalyst) + 15% VD (thinner) |
| 50 Type P | Wierderhold Sanitaertechnik (Germany) | 1K acrylic | 15% VD (thinner) |

The polycarbonate substrates printed with the above inks were then flow coated using either SHP401 or SHP470 acrylic primers (General Electric Silicones). The flow coating of the acrylic primers was performed at room temperature and atmospheric pressure. The applied print was then inspected to see if the ink bled during the application or if the acrylic primer "crawled" during the application. Finally, the surface of the applied print was lightly rubbed with a cotton applicator to determine if the ink had softened to the point where it could be easily rubbed-off.

As shown in Table II below less than 16% (8 out of 50) of the inks tested passed the compatibility test for one of the primer systems. In order to pass the test the ink needed to pass all three subcomponents of the test, including ink rub, ink bleed, and primer crawl for each primer/hard-coat system. The single component inks that passed the compatibility test for one or more of the primer systems represented less than 10% (4 out of 38) of the entire number of inks evaluated.

TABLE II

Compatibility Test Results

| INK TYPE | Ink Rub SHP 401 | Ink Rub SHP 470 | Ink Bleed SHP 401 | Ink Bleed SHP 470 | Primer Crawl SHP 401 | Primer Crawl SHP 470 |
|---|---|---|---|---|---|---|
| 1 Correx | Fail | Fail | Fail | Fail | Pass | Pass |
| 2 DynaPoll | Fail | Fail | Pass | Pass | Pass | Pass |
| 3 Gloss Vinyl | Pass | Fail | Pass | Pass | Fail | Pass |
| 4 Matt Vinyl | Fail | Fail | Pass | Pass | Pass | Pass |
| 5 C28 | Fail | Fail | Pass | Pass | Pass | Pass |
| 6 C70 | Fail | Pass | Pass | Pass | Fail | Pass |
| 7 C99 | Fail | Fail | Pass | Pass | Fail | Pass |
| 8 HG-N501 | Fail | Fail | Pass | Pass | Fail | Pass |
| 9 PO | Fail | Fail | Fail | Pass | Pass | Pass |
| 10 Color Gloss | Fail | Fail | Fail | Fail | Fail | Fail |
| 11 PLT15 | Fail | Fail | Pass | Pass | Fail | Pass |
| 12 PLT272 | Fail | Fail | Pass | Pass | Pass | Pass |
| 13 DR III | Fail | Fail | Fail | Fail | Fail | Fail |
| 14 PAC Series | Fail | Fail | Pass | Pass | Pass | Pass |
| 15 AM Series | Pass | Pass | Pass | Pass | Fail | Fail |
| 16 TPL | Fail | Fail | Pass | Pass | Fail | Pass |
| 17 TPR | Fail | Fail | Pass | Pass | Fail | Fail |
| 18 70000 | Fail | Fail | Fail | Fail | Pass | Pass |
| 19 GV | Fail | Fail | Pass | Pass | Pass | Pass |
| 20 S2 | Fail | Fail | Fail | Fail | Fail | Pass |
| 21 8800 Series | Fail | Fail | Pass | Pass | Pass | Pass |
| 22 8400 Series | PASS | PASS | PASS | PASS | PASS | PASS |
| 23 3578/3579 | Fail | Fail | Fail | Fail | Pass | Pass |
| 24 3478/3479 | Fail | Fail | Fail | Fail | Pass | Pass |
| 25 MSK-1019 | Fail | Fail | Fail | Fail | Pass | Pass |
| 26 TF-4450 | Fail | Fail | Fail | Fail | Pass | Pass |
| 27 711-8005 | Fail | Fail | Pass | Pass | Fail | Fail |
| 28 750-8005 | Pass | Fail | Pass | Pass | Fail | Fail |
| 29 752-8005 | Pass | Pass | Pass | Pass | Fail | Fail |
| 30 784-8005 | Pass | Pass | Pass | Pass | Fail | Fail |
| 31 Type B | PASS | PASS | PASS | PASS | PASS | PASS |
| 32 Type KT | Fail | Fail | Pass | Pass | Fail | Fail |
| 33 Type M | Fail | Pass | Pass | Pass | Fail | Fail |
| 34 Type V3000 | PASS | PASS | PASS | PASS | PASS | PASS |
| 35 Sorte P 948 | Fail | Fail | Pass | Pass | Pass | Pass |
| 36 Noriphan HTR | PASS | PASS | PASS | PASS | PASS | PASS |
| 37 303LE | PASS | PASS | PASS | PASS | PASS | PASS |
| 38 180PE | Fail | Fail | Pass | Pass | Fail | Pass |
| 39 450JK | PASS | PASS | PASS | PASS | PASS | PASS |
| 40 700ST | PASS | PASS | PASS | PASS | PASS | PASS |
| 41 1979 | Fail | Fail | Pass | Pass | Fail | Fail |
| 42 7779 | Fail | Fail | Pass | Pass | Pass | Pass |
| 43 071-009 | Fail | Fail | Fail | Fail | Pass | Pass |
| 44 GL-3517 | Fail | Fail | Pass | Pass | Pass | Pass |
| 45 HD-7179 | Fail | Fail | Pass | Pass | Fail | Fail |
| 46 STB | PASS | PASS | PASS | PASS | PASS | PASS |
| 47 STE | Fail | Fail | Pass | Pass | Fail | Fail |
| 48 V2000 | Fail | Fail | Pass | Pass | Fail | Pass |
| 49 Type B | Fail | Fail | Pass | Pass | Pass | Pass |
| 50 Type P | Fail | Fail | Pass | Pass | Pass | Pass |

As seen from the results obtained above, only inks that were compatible with the primer system were inks that contained a polycarbonate resin (Ink #36), a polyester resin (Ink #22), or an acrylic resin (Ink #'s 34 & 39). In the case of an acrylic binder, only about 10% of the acrylic resins tested passed the compatibility test with the applied primers. Thus a specific type of an acrylic resin is necessary to be compatible with an acrylic primer/silicone hard-coat system. All radiation curable inks (Inks #'s 23–26, & 43) failed the compatibility test.

EXAMPLE 2

Cataplasma-Like & Water Immersion Testing

Multiple polycarbonate substrates were screen printed with inks that passed the compatibility test in Example 1. Each printed polycarbonate substrate was dried or cured according to the manufacturer's recommended conditions. Each printed polycarbonate substrate was then coated with SHP401 (acrylic primer) and AS4000 (silicone hard-coat) or SHP470 (acrylic primer) and AS4700 (silicone hard-coat) according to GE Silicone's recommended coating conditions. Finally the printed polycarbonate substrates with the coating system were subjected to the water immersion and cataplasma-like tests.

Table III represents the 8 inks that passed the compatibly test and were subjected to the water immersion test and Cataplasma-Like test results. As seen below none of these inks were found to pass both water immersion and Cataplasma-Like testing with an acrylic/silicone hard-coat protective layer. The polycarbonate ink (Ink # 36) and acrylic ink (Ink #39) passed the 10 day water immersion test. However, the polycarbonate ink did not pass the optical requirement(s) in the Cataplasma-Like test, while the acrylic inks (#'s 34 & 39) did not pass the adhesion requirement in the Cataplasma-Like test. Similarly, the epoxy ink (Ink #46) passed the optical requirement(s) in the Cataplasma-Like test, but failed adhesion in both this test and in water immersion testing.

TABLE III

| INK TYPE | RESIN FUNCTIONALITY | Water Immersion (% retention) AS4000 | Water Immersion (% retention) AS4700 |
|---|---|---|---|
| 22 8400 Series | 1K polyester | Fail | Fail |
| 31 Type B | 2K polyester | Fail | Fail |
| 34 Type V3000 | 1K acrylic | Fail | Fail |
| 36 Noriphan HTR | 1K polycarbonate | PASS | PASS |
| 37 303LE | 2K polyurethane | Fail | Fail |
| 39 450JK | 1K acrylic | PASS | PASS |
| 40 700ST | 2K polyurethane | Fail | Fail |
| 46 STB | 2K epoxy | Fail | Fail |

TABLE III-continued

|   | | CATAPLASMA-LIKE for SHP401/AS4000 | | CATAPLASMA-LIKE for SHP470/AS4700 | |
|---|---|---|---|---|---|
|   | | Optical Appearance | % Retention | Optical Appearance | % Retention |
| 22 | 8400 Series | PASS | Fail | PASS | Fail |
| 31 | Type B | Fail | Fail | Fail | Fail |
| 34 | Type V3000 | PASS | Fail | Fail | Fail |
| 36 | Noriphan HTR | Fail | Fail | Fail | Fail |
| 37 | 303LE | Fail | Fail | Fail | Fail |
| 39 | 450JK | PASS | Fail | PASS | Fail |
| 40 | 700ST | Fail | Fail | Fail | Fail |
| 46 | STB | PASS | Fail | PASS | Fail |

EXAMPLE 3

Polycarbonate/Polyester (PC/PE)

Since the single components inks that passed the compatibility test did pass the water immersion and cataplasma like test, the inventors formulated ral ink compositions by blending various ratios of a polycarbonate ink with ester ink.

Table IV represents the ink composition (500 gms) that were made by blending various ratios of a polycarbonate ink (#36) (Noriphan® HTR-952, Pröll KG, Germany) with a polyester ink (#22) (8452, Nazdar Inc., Kansas) using a high speed blade mixer. After the two inks were blended, additional solvent (097/003 retarder, Pröll KG & RE196 retarder, Nazdar Inc.) was mixed in with the ink prior to the addition of the isocyanate. The aromatic isocyanate (NB-70, Nazdar Inc., Kansas) was the last component added to the blended ink.

TABLE IV

| # | PC:PE ratio | polycarbonate (gms) | polyester (gms) | 10% Solvent (gms) | 4% isocyanate (gms) |
|---|---|---|---|---|---|
| 36 | 100:0 | 430 | 0 | 50 | 20 |
| A | 80:20 | 344 | 86 | 50 | 20 |
| B | 50:50 | 215 | 215 | 50 | 20 |
| C | 20:80 | 86 | 344 | 50 | 20 |
| 22 | 0:100 | 0 | 430 | 50 | 20 |

Each of the inks described above was applied via screen printing to polycarbonate substrates and then over-coated with SHP401/AS4000 or SHP470/AS4700 hard-coat systems. The substrates were then subjected to water immersion and Cataplasma-Like testing described above. For comparison purposes, the polycarbonate ink (#36) and the polyester ink (#22) were also tested.

TABLE V

| # | PC:PE ratio | Water Immersion (% retention) | |
|---|---|---|---|
|   | | AS4000 | AS4700 |
| 36 | 100:0 | PASS | PASS |
| A | 80:20 | PASS | PASS |
| B | 50:50 | PASS/FAIL Mixture | PASS/FAIL Mixture |
| C | 20:80 | Fail | Fail |
| 22 | 0:100 | Fail | Fail |

| | | CATAPLASMA-LIKE for SHP401/AS4000 | | CATAPLASMA-LIKE for SHP470/AS4700 | |
|---|---|---|---|---|---|
| # | PC:PE ratio | Optical Appearance | % Retention | Optical Appearance | % Retention |
| 36 | 100:0 | Fail | Fail | Fail | Fail |
| A | 80:20 | PASS | PASS | PASS | PASS |
| B | 50:50 | PASS | PASS/Fail | PASS | PASS/Fail |
| C | 20:80 | PASS | Fail | PASS | Fail |
| 22 | 0:100 | PASS | Fail | PASS | Fail |

As seen in Table V, a blend of a polycarbonate (PC) to polyester (PE) ratio of 80 PC:20 PE (mixture A), unexpectantly passes all test requirements for both water immersion and Cataplasma-Like tests. As seen from the above table a ratio of 100 PC:0 PE fails the Cataplasma-Like tests. Similarly blended ink C also fails the tests. Multiple samples of blended ink B was observed to be borderline between passing and failing all test requirements. All ink blends outside of the range described above were found to fail either water immersion or Cataplasma-Like testing.

EXAMPLE 4

Acrylic and Polyester Blend with a Melamine Addictive

The inventors substituted the polycarbonate ink for acrylic ink and formulated several ink compositions (500 gms) by blending various ratios of acrylic inks, R (450 JK, Ruco Druckenfarb, Germany) and SC (Type V3000, Sun Chemical AG, Switzerland) with a polyester ink (8452, Nazdar Inc., Kansas) using a high speed blade mixer. The composition of each blended ink is shown in the Table VI below. After the two inks were blended, additional solvent (700010, Sun Chemical AG & RE196 retarder, Nazdar Inc.) was mixed in with the ink prior to the addition of either an isocyanate or melamine. The aromatic isocyanate (NB-70, Nazdar Inc., Kansas) or melamine (C2, TOSH srl, Italy) was the last component added to the blended ink.

TABLE VI

| # | AC:PE ratio | polycarbonate (gms) | polyester (gms) | 10% Solvent (gms) | 4% isocyanate (gms) | 4% melamine (gms) |
|---|---|---|---|---|---|---|
| 39 | 100R:0 | 430 | 0 | 50 | 20 | 0 |
| 34 | 100SC:0 | 430 | 0 | 50 | 20 | 0 |
| D | 67R:33 | 288 | 142 | 50 | 20 | 0 |
| E | 67R:33 | 288 | 142 | 50 | 0 | 20 |
| F | 67SC:33 | 288 | 142 | 50 | 20 | 0 |
| G | 33R:67 | 142 | 288 | 50 | 0 | 20 |
| H | 33R:67 | 142 | 288 | 50 | 20 | 0 |

TABLE VI-continued

| # | AC:PE ratio | polycarbonate (gms) | polyester (gms) | 10% Solvent (gms) | 4% isocyanate (gms) | 4% melamine (gms) |
|---|---|---|---|---|---|---|
| I | 33SC:67 | 142 | 288 | 50 | 20 | 0 |
| 22 | 0:100 | 0 | 430 | 50 | 20 | 0 |

Each of the inks described above was applied via screen printing to polycarbonate substrate and then over-coated with the SHP401/AS4000 hard-coat system and were subjected to water immersion and Cataplasma-Like testing. For comparison purposes, the acrylic inks (#'s 34 & 39) and the polyester ink (#22) were also utilized in this testing. The measured test results for each polycarbonate substrate is described in Table VII below.

TABLE VII

| | | Water Immersion (% retention) | CATAPLASMA-LIKE for SHP401/AS4000 | |
|---|---|---|---|---|
| # | AC:PE ratio | AS4000 | Optical Appearance | % Retention |
| 39 | 100R:0 | PASS | PASS | Fail |
| 34 | 100SC:0 | Fail | PASS | Fail |
| D | 67R:33 | PASS | PASS | PASS |
| E | 67R:33 | Fail | Fail | Fail |
| F | 67SC:33 | PASS | PASS | PASS |
| G | 33R:67 | PASS | Fail | Fail |
| H | 33R:67 | PASS | Fail | Fail |
| I | 33SC:67 | PASS | Fail | Fail |
| 22 | 0:100 | Fail | PASS | Fail |

As seen form the test results above, blended inks containing a AC:PE ratio of less than 100:0 and greater than 50:50, were found to pass all test requirements for both water immersion and Cataplasma-Like tests. All ink blends outside of the specified range were found to fail either water immersion or Cataplasma-Like testing.

As seen form the above table, substitution of a melamine for the isocyanate additive for a blended ink within the specified range (blended composition #'s E & G) hinders the blended ink from passing all of the requirements for the water immersion and Cataplasma-Like tests. Thus an isocyanate is the preferred additive necessary to assist the blended formulation in passing all of the test requirements.

EXAMPLE 4

Full Cataplasma Test

An ink composition (744 gms) was made by blending about an 80:20 ratio of a polycarbonate ink (Noriphan® HTR-952, Pröll KG, Germany) to a polyester ink (8452, Nazdar Inc., Kansas) using a high speed blade mixer. The composition of the blended ink is shown in Table VIII below. After this ink was blended, additional solvent (097/003 retarder, Pröll KG & RE196 retarder, Nazdar Inc.) was mixed in with the ink prior to the addition of the isocyanate. The aromatic isocyanate (NB-70, Nazdar Inc., Kansas) was the last component added to the blended ink.

TABLE VIII

| | Composition (J) | | |
|---|---|---|---|
| COMPONENT DESCRIPTION | TOTAL WEIGHT (grams) | INDIVIDUAL SOLIDS (wt %) | TOTAL SOLIDS (wt %) |
| Polycarbonate Ink | 521 | 34 | 72 |
| Polyester Ink | 132 | 34 | 18 |
| Additional Solvent | 65 | 0 | 0 |
| Isocyanate | 26 | 100 | 10 |
| Dispersant | 0 | 100 | 0 |
| Optically Enhancing Filler | 0 | 100 | 0 |

The ink composition described above was applied via screen printing to multiple polycarbonate substrates (specifically seven) and then over-coated with SHP470/AS4700 hard-coat system and subjected to a full Cataplasma test. A full Cataplasma test is identical to the Cataplasma-Like test described above with respect to experimental conditions, as well as cross-hatch adhesion and optical properties for the printed ink and coating. However, in the full Cataplasma test one additional requirement must be met at the end of the test. This requirement consists of 90% cohesive failure of the urethane adhesive system applied to the printed and coated surface at the start of the test.

The adhesive system applied to the printed/coated polycarbonate substrates consists of a silicone coupling agent (Betaseal 53518, Dow Essex, Michigan), an urethane primer (Betaseal 48520A, Dow Essex), and an urethane adhesive (Betaseal 1815, Dow Essex). The adhesive system is applied as a bead to the printed ink/coating and cured for 96 hours at room temperature (about 23° C.) according to the manufacturer's recommended conditions. After the adhesive system is cured, the Cataplasma test set-up and conditions are initiated as described in Example 2. Upon completion of the Cataplasma test conditions, the adhesive is peeled from the printed/coated substrate. A cut is made perpendicular to the adhesive bead every one centimeter during the peel of the adhesive. The area from which the adhesive was peeled is then inspected to determine the failure mode of the adhesive system. The measured test results for each substrate are described in Table IX below.

TABLE IX

| | Cross-Hatch Adhesion (% Retention) | Optical Appearance | Adhesive Failure (% Cohesive) |
|---|---|---|---|
| J - run 1 | 100 | No Change | 100 |
| J - run 2 | 100 | No Change | 85 |
| J - run 3 | 100 | No Change | 100 |
| J - run 4 | 100 | No Change | 100 |
| J - run 5 | 100 | No Change | 95 |
| J - run 6 | 99 | No Change | 100 |
| J - run 7 | 99 | No Change | 95 |

TABLE IX-continued

|  | Cross-Hatch Adhesion (% Retention) | Optical Appearance | Adhesive Failure (% Cohesive) |
| --- | --- | --- | --- |
| AVERAGE | 99.7 | No Change | 96.4 |
| StDev | 0.5 | x | 5.6 |

This example demonstrates that a blended formulation with a polycarbonate to polyester ratio of about 80:20 passes not only cross-hatch adhesion and optical property requirements, but also cohesive failure of an applied adhesive system. The average cross-hatch adhesion was found to be about 100% retention after the Cataplasma test. The optical properties for all samples were found not to change during the Cataplasma test. Finally, the average cohesive failure of the adhesive system was found to be 96.4%+/−5.6%.

EXAMPLE 6

An ink composition (867 gms) were made by blending about an 80:20 ratio of a polycarbonate ink (Noriphan® HTR-952, Pröll KG, Germany) to a polyester ink (8452, Nazdar Inc., Kansas) using a high speed blade mixer. The composition of the blended ink is shown in the Table X below. After the polycarbonate and polyester inks were blended, a dispersed mixture of optically enhancing filler (titanium dioxide, Ti-Pure® R-706, DuPont Titanium Technologies, Delaware), dispersant (organomodified polysiloxane, Tego® Wet KL 245, Goldshmidt Chemical Corp., Virginia), and additional solvent (097/003 retarder, Pröll KG & RE196 retarder, Nazdar Inc.), were slowly mixed into the ink blend. The opacity enhancing filler, dispersant, and additional solvent were mixed using a high speed blade mixer. The aromatic isocyanate (NB-70, Nazdar Inc., Kansas) was added to the blended ink last

TABLE X

| | Composition (K) | | |
| --- | --- | --- | --- |
| COMPONENT DESCRIPTION | TOTAL WEIGHT (gms) | INDIVIDUAL SOLIDS (wt %) | TOTAL SOLIDS (wt %) |
| Polycarbonate Ink | 521 | 34 | 50 |
| Polyester Ink | 132 | 34 | 12 |
| Retarder | 65 | 0 | 0 |
| Isocyanate | 26 | 100 | 7 |
| Dispersant | 5 | 100 | 1 |
| Optical Enhancing Filler | 118 | 100 | 30 |

The ink described above was applied via screen printing to multiple polycarbonate substrates and then over-coated with a SHP401/AS4000 hard-coat system and then subjected to water immersion and Cataplasma-like tests. The results of the water immersion and Cataplasma-Like tests are shown in the following Table XI.

TABLE XI

| | CATAPLASMA-LIKE TEST | | |
| --- | --- | --- | --- |
| | Water Immersion (% Retention) | Optical Appearance | Cross-Hatch Adhesion (% Retention) |
| K-run 1 | 99 | No Change | 100 |
| K-run 2 | 100 | No Change | 97 |

As shown in Table XI, the blended ink formulation of polycarbonate and polyester resins can include the addition of a optical enhancing filler and a dispersant without affecting the ability of the applied ink print to survive both water immersion and Cataplasma-Like test requirements.

A person skilled in the art will recognize from the previous description modifications and changes can be made to the preferred embodiment of the invention without departing from the scope of the invention as defined in the following claims.

What is claimed is:

1. A polycarbonate substrate, the substrate comprising:
   a substrate ink printed and cured on a surface of the substrate, the substrate ink comprising:
   about 61 to 90 weight % synthetic resin mixture; and
   about 6 to 10 weight % Isocyanate additive, the synthetic resin mixture being about 12 to 18 weight % of a polyester resin and about 49 to 72 weight % of a polycarbonate resin or an acrylic resin; and
   a hard coat system applied on the substrate ink and having a hard coat solvent selected from the group consisting of glycol ethers, ketones, alcohols and acetates;
   the substrate ink being adaptable to adhere to the surface of the substrate and pass compatability, water immersion, and Cataplasma tests.

2. The substrate of claim 1, wherein the synthetic resin contains at least one of hydroxyl functional group and carboxyl functional group such that the synthetic resin cross-links with itself to be compatible with the hard-coat system while maintaining adhesion to the surface of the substrate.

3. The substrate of claim 1, wherein the polycarbonate resin is a mixture of polycarbonate resin and high temperature stable pigments dispersed in ethylbenzene, solvent Naphtha, 1,2 4-trimethylbenzene, xylene isomers, diacetone alcohol, mesitylene, n-butyl alcohol, and esters.

4. The substrate of claim 1, wherein the polyester resin comprises about 19 weight % to 33 weight % polyester resin mixture, up to about 38 weight % $TiO_2$, up to about 11 weight % carbon black, about 4 weight % to 10 weight % gamma-butyrolactone, up to about 11 weight % aliphatic dibasic acid ester and colorant pigment dispersed in about 14 weight % to 28 weight % petroleum distillate, about 4 weight % to 8 weight % cyclohexanone mixture, and less than about 4 weight % naphthalene.

5. The substrate of claim 1, wherein the acrylic resin comprises saturated acrylic resin and pigments dispersed in about 5 weight % to 10 weight % cyclohexanone, about 1 weight % to 5 weight % trimethylbenzene, about 1 weight % to 5 weight % xylene, about 1 weight % to 5 weight % isopropylbenzene, about 10 weight % to 20 weight % benzyl alcohol, and butylglycolate.

6. The substrate of claim 1, wherein the hard-coat system is a primer/silicone top-coat system or a primeness top-coat system.

7. The substrate of claim 6, wherein the primer is an acrylic primer.

8. The substrate of claim 6, wherein the primer has a resin content of about 2% to 7% wt by weight of the primer.

9. The substrate of claim 8, wherein the resin is polymethyl methacrylate.

10. The substrate of claim 6, wherein the primeness top-coat system contains methanol (M), isopropyl alcohol (IPA), n-butyl alcohol (B), and water (W) in a weight ratio of 3(M):6(IPA):3(B):1(W).

11. The substrate of claim 1, wherein the solvent is diacetone alcohol or 1-methoxy-2-propanol.

12. A polycarbonate substrate, the substrate comprising:
   a substrate ink printed on a surface of the substrate, the ink having a composition comprising:

1.9% to 13.2% by weight of a polyester resin obtained from a polyester ink;

5.4% to 34.2% by weight of a polycarbonate resin or an acrylic resin being obtained from a polycarbonate ink or acrylic ink;

0.1% to 5.0% by weight isocyanate additive and the balance being an ink solvent;

a hard coat system applied on top of the ink after the ink is cured, the hard coats system then having a hard coat solvent selected from the group consisting of glycol ethers, ketones, alcohols and acetates;

the substrate ink adaptable to adhere to the surface of the substrate and pass compatability, water immersion, and Cataplasma tests.

13. The substrate of claim 12, wherein the ink further comprises:

3.6% to 38.2% of a colorant pigment;

up to 45.2% of an opacity enhancing filler; and up to 1.5% of a dispersant.

14. The substrate of claim 13, wherein the dispersant is an organomodified polysiloxane.

15. The substrate of claim 14, wherein the organomodified polysiloxane is a polyether siloxane copolymer.

16. The substrate of claim 13, wherein the opacity enhancing filler is an inorganic oxide with a mean particle size less than or equal to about 1.0 micrometers.

17. The substrate of claim 16, wherein the inorganic oxide is $TiO_2$.

18. The substrate of claim 13, wherein colorant pigment is carbon black, channel black, furnace black, or titanium dioxide.

19. The substrate of claim 12, wherein the polycarbonate ink is a mixture of polycarbonate resin and high temperature stable pigments dispersed in ethylbenzene, solvent Naphtha, 1, 2, 4-trimethylbenzene, xylene isomers, diacetone alcohol, mesitylene, n-butyl alcohol, and esters.

20. The substrate of claim 12, wherein the polyester resin comprises about 19 weight % to 33 weight % polyester resin mixture, up to about 38 weight % $TiO_2$, up to about 11 weight % carbon black, about 4 weight % to 10 weight % gamma-butyrolactone, up to about 11 weight % aliphatic dibasic acid ester and colorant pigment dispersed in about 14 weight % to 28 weight % petroleum distillate, about 4 weight % to 8 weight % cyclohexanone mixture, and less than about 4 weight % naphthalene.

21. The substrate of claim 12, wherein the acrylic resin comprises saturated acrylic resin and pigments dispersed in about 5 weight % to 10 weight % cyclohexanone, about 1 weight % to 5 weight % trimethylbenzene, about 1 weight % to 5 weight % xylene, about 1 weight % to 5 weight % isopropylbenzene, about 10 weight % to 20 weight % benzyl alcohol, and butylglycolate.

22. The substrate of claim 12, wherein the isocyanate is selected from a group consisting of aromatic polyisocyanate and aliphatic diisocyanate.

23. The substrate of claim 12, wherein the ink adheres to the substrate when the polycarbonate substrate is subjected to water immersion and Cataplasma tests.

24. The substrate of claim 12, wherein the polyester resin and polycarbonate resin or acrylic resin contains at least one hydroxyl or carboxyl functional group such that the polyester resin and polycarbonate resin or acrylic resin react with the isocyanate to be compatible with the hard-coat system while maintaining adhesion to the surface of the substrate.

25. The substrate of claim 12, wherein the ink is compatible with a solvent In the hard-coat system, wherein the solvent selected from the group comprising of glycol ethers, ketones, alcohols and acetates.

26. The substrate of claim 25, wherein the solvent is diacetone alcohol or 1-methoxy-2-proponol.

27. The substrate of claim 12, wherein the hard-coat system is a primer/silicone top-coat system or a primeness top-coat system.

28. The substrate of claim 27, wherein the primer is an acrylic primer.

29. The substrate of claim 27, wherein the resin content in the primer is about 2% to 7% wt of the primer.

30. The substrate of claim 29, wherein the resin is polymethyl methacrylate.

31. The substrate of claim 28, wherein the primeness top-coat system contains methanol (M), isopropyl alcohol (IPA), n-butyl alcohol (B), and water (W) in a weight ratio of 3(M):6(IPA):3(B):1(W).

32. A polycarbonate substrate, the substrate comprising:

a substrate ink printed on a surface of the substrate, the substrate ink having a composition comprising:

between 1.9 and 13.2 weight % of a polyester resin obtained from a polyester ink;

between 5.4 and 34.2 weight % of a polycarbonate resin or acrylic resin obtained from a polycarbonate ink or acrylic ink, the substrate ink having a ratio of the polycarbonate or acrylic ink to the polyester ink of less than 100:0 and greater than 50:50;

between 0.1 and 5.0 weight % of an isocyanate; and balance being a solvent, the solvent being a mixture of dibasic esters, aromatic highdrocarbons, and ketones; and a hard-coat system applied an the ink such that the ink adheres to the surface and is compatible with the hard-coat system.

\* \* \* \* \*